G. SIEURIN.
CLUTCH.
APPLICATION FILED MAR. 19, 1912.
1,222,897.
Patented Apr. 17, 1917.
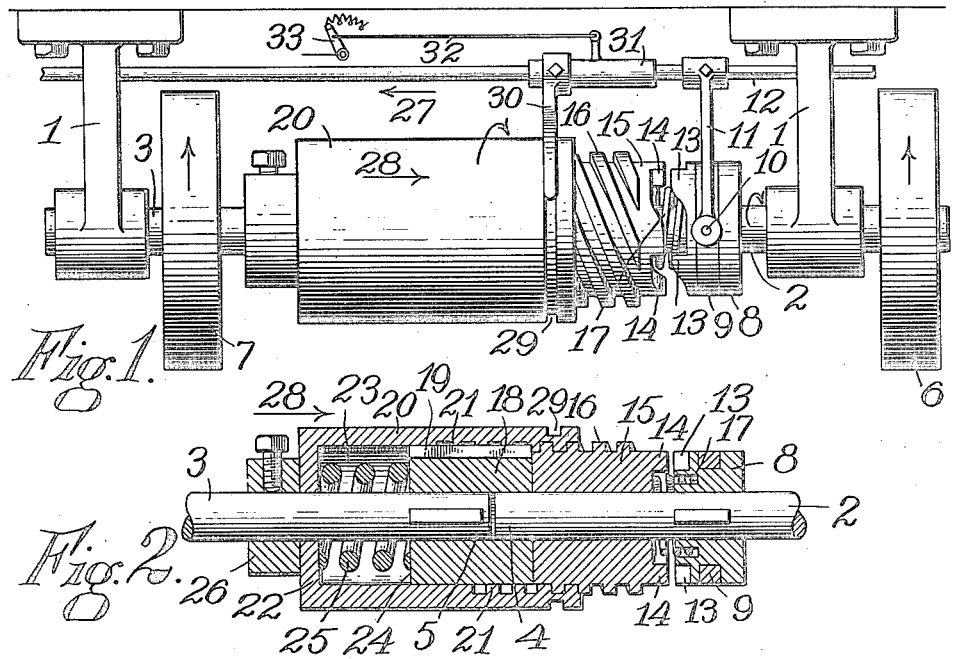
Fig. 1.
Fig. 2.
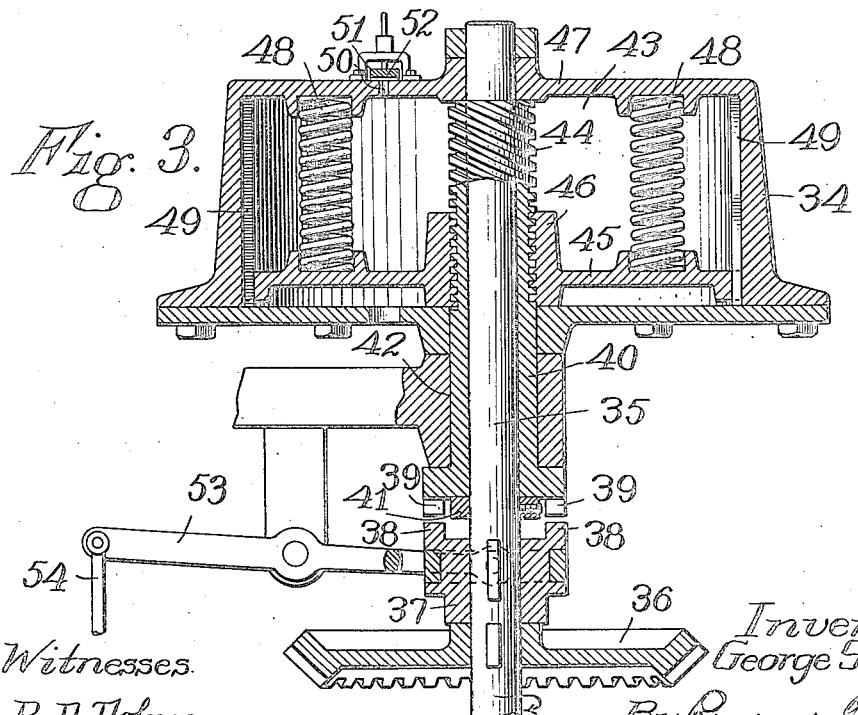
Fig. 3.
Witnesses.
R. D. Tolman.
Penelope Cumberbach.
Inventor.
George Sieurin.
By Rufus B. Fowler,
Attorney.

UNITED STATES PATENT OFFICE.

GEORGE SIEURIN, OF SHREWSBURY, MASSACHUSETTS.

CLUTCH.

1,222,897. Specification of Letters Patent. Patented Apr. 17, 1917.

Application filed March 19, 1912. Serial No. 684,707.

*To all whom it may concern:*

Be it known that I, GEORGE SIEURIN, a citizen of the United States, residing at Shrewsbury, in the county of Worcester and Commonwealth of Massachusetts, have invented a new and useful Improvement in Clutches, of which the following is a specification, accompanied by drawings forming a part of the same.

The objects of my invention are to provide an improved clutching mechanism by which rotary motion may be gradually transmitted from a driving member to a driven member, and by which the clutching mechanism may be utilized to determine and regulate the amount of power transmitted. These objects, among others, I accomplish by the construction and arrangement of parts as hereinafter described and pointed out in the annexed claim.

Referring to the accompanying drawings, Figure 1 represents a front elevation of a clutching mechanism embodying my invention, and applied to a countershaft.

Fig. 2 is a central sectional view of the clutching mechanism.

Fig. 3 is a central sectional view of a wire drawing block operatively connected with a driving shaft by means of a clutch embodying my present invention.

Similar reference letters and figures refer to similar parts in the different views.

Referring to Fig. 1 of the drawings, 1, 1, denote a pair of hangers by which a countershaft is supported, comprising two separate shafts 2 and 3, having opposing ends 4 and 5 inclosed within the clutching mechanism, as shown in Fig. 2. The shaft 2 is rotated by power applied through a belt pulley 6, and the shaft 3 is provided with a belt pulley 7 by which power is transmitted. Keyed to the rotating shaft 2 and capable of sliding thereon is a collar 8 having an annular groove in its periphery containing a ring 9, provided with gudgeons 10 journaled in the arms 11 of a slidable shipper rod 12. The collar 8 is provided with suitable clutching means, consisting in the present instance of the teeth 13, preferably ratchet shaped. The teeth 13 are adapted to engage similar teeth 14 upon a sleeve 15 provided with a screwthread 16 having a steep pitch, preferably at an angle of about 65° to the axial line of the sleeve.

The sleeve 15 is journaled loosely upon the shaft 2 and the opposing faces of the sleeve 15 and collar 8 are recessed to receive a spiral spring 17 with its tension applied to separate the sleeve and collar. Keyed to the inner end 5 of the shaft 3 and inclosing the end 4 of the shaft 2, is a collar 18 connected by a spline 19 with a sleeve 20, having an open end provided with an internal screwthread 21 engaging the screwthread 16 on the sleeve 15. The opposite end of the sleeve 20 is closed by an end wall 22 forming an inclosed chamber 23 between the end wall 22 and the opposing end 24 of the collar 18. In the chamber 23 I inclose a spiral thrust spring 25. The collar 18 is held from longitudinal movement on the end of the shaft 3 and the sleeve 20 is held from longitudinal movement in one direction by a collar 26. The normal position of the parts is represented in sectional view in Fig. 2, with the clutch teeth 13 and 14 separated.

In order to bring the clutch into operation the clutching members comprising the teeth 13 and 14 are brought into engagement by sliding the shipper rod 12 in the direction of the arrow 27, Fig. 1, causing the rotation of the shaft 2 to be imparted to the screwthreaded sleeve 15. As the sleeve 20 is held from rotation by its spline connection with the collar 18, it will be gradually moved by the action of the screwthread 16 in the direction of the arrow 28, Fig. 2, thereby compressing the spiral spring 25. The compression of the spiral spring 25 causes a pressure to be exerted between the engaged screwthreads 16 and 21. The movement of the sleeve 20, however, will be continued in the direction of the arrow 28 until the compression of the spring 25 has increased the pressure between the engaged screwthreads 16 and 21 in excess of the resistance offered by the load upon the shaft 3. When this occurs the sleeve 20 will be rotated by the sleeve 15 and will impart its rotative movement through the collar 18 to the shaft 3 and pulley 7. The tension exerted by the spiral spring 25 will then measure the power transmitted from the shaft 2 to the shaft 3, and as the tension of the compressed spring 25 is in an exact ratio to the movement of the sleeve 20 in the direction of the arrow 28, the extent of this movement may be utilized to determine the amount of power transmitted by the clutch. Various means may be employed by which this result may be accomplished, but I have indicated only one such in Fig. 1, which consists in forming an annular groove 29 in the periphery of the sleeve 20, and engaging the groove 29 by a forked lever 30 attached to a sliding sleeve 31 on the shipper rod 12. The sleeve 31 is connected by a link 32 with the arm 33 of a rheostat forming part of the electrical circuit by which an electric motor is employed to impart power through the belt pulley 6 to the shaft 2, said rehostat being arranged to control the power transmitted from the motor by the movement of the sleeve 20 in the direction of the arrow 28, limiting the power so transmitted within predetermined limits. Instead of connecting the sleeve 31 with the lever of a rheostat, a similar connection can be made with the throttle valve of a steam engine, or with a governor by which the speed may be regulated. I have not illustrated such devices, however, as they form no part of my present invention.

My present purpose is simply to disclose the fact that the movement of the sleeve 20 in the direction of the arrow 28 may be utilized for the purpose of limiting or indicating the amount of power transmitted, inasmuch as the movement of the sleeve bears a fixed relation to the tension exerted by the spring 25, and the tension exerted by the spring 25 also bears a fixed relation to the amount of power transmitted through the clutching mechanism.

My present device, as embodied in the construction illustrated in the drawings, comprises in point of fact, a main clutching mechanism, by means of which the power is transmitted from shaft 2 to shaft 3, and a clutching mechanism by which the former is brought into operation consisting of the clutch teeth 13 and 14. The latter clutching members I therefore term the initial clutching means, as its only function is to rotate the sleeve 15 for the purpose of compressing the spring 25.

In order to release the clutching mechanism and disconnect the driving shaft from the driven shaft 3, it is only necessary to disengage the initial clutching mechanism when the tension stored in the spiral spring 25 will cause the spring to expand and reverse the longitudinal movement of the sleeve 20, which will be accompanied by a reversal of the rotary motion of the screwthreaded sleeve 15.

In Fig. 3 I have represented in sectional view my invention as applied to a wire drawing block 34. The driving element by which the block is rotated consists of a vertical rotating shaft 35 which, in the present instance, is driven by means of a bevel gear 36 keyed to the shaft and engaging a bevel gear, not shown, upon a horizontal driving shaft. Keyed to the shaft 35 and capable of sliding thereon is a collar 37, having clutch teeth 38 adapted to be brought into engagement with similar clutching teeth 39 on the lower end of a sleeve 40. The sleeve 40 is supported against gravity by means of a collar 41 attached to the shaft 35. The wire drawing block 34 is journaled upon the sleeve 40 and is supported against gravity upon the fixed bearing 42, in which the sleeve 40 is journaled. The sleeve 40 extends upwardly through the chamber 43 inclosed in the wire drawing block, and is provided with a screwthread 44 at an angle to the axis of the rotating sleeve of about 65°.

Inclosed within the chamber 43 is a follower 45 having a hub 46 provided with an internal screwthread which engages the screwthread 44 on the sleeve 40. Between the upper or end wall 47 of the wire drawing block and the follower 45, I insert a series of spiral springs 48 held in position at their opposite ends by means of recesses formed respectively in the end wall 47 and the follower 45. The follower 45 has a spline connection with the wire drawing block 34 by means of its engagement with ways 49 on the sides of the wire drawing block. The inclosed chamber 43 of the wire drawing block is preferably cylindrical and the follower 45 is made to fit the interior of the wire drawing block but to be capable of sliding freely therein.

In the end wall 47 of the wire drawing block is a vent opening 50 which is normally closed by a gravity valve 51. The face of the valve 51 is provided with a diametrical groove 52 for a purpose herein described.

The operation of my improved clutch as applied to a wire drawing block, assuming the parts to be in the normal position shown in Fig. 3, is as follows:—The collar 37 is raised to bring the clutch teeth 38 and 39 into engagement by means of a shipping lever 53 pivoted upon the fixed framework, and having a link 54 extending to a foot treadle, not shown. As soon as the clutch teeth 38 and 39 have been engaged, the rotary motion of the shaft 35 is communicated to the sleeve 40, and as the follower 45 is prevented from rotation within the wire drawing block by its spline engagement therewith, assuming the block to be held from rotation by the strain of the wire being drawn, or other means, the follower will be made to travel upwardly on the screwthreaded sleeve 40, thereby compressing the spiral springs 48. As soon as the tension of the spiral spring acting against the end wall 47 of the drawing block and the follower 45 produces a compression between the wall 47 and follower 45 and friction between the screwthreaded sleeve 40 and the follower 45 greater than the load or the resistance to the rotation of the block 34, the block 34 will begin to rotate.

During the upward movement of the follower 45 air is forced out of the chamber 43 through the vent opening 50. As soon as the initial clutching mechanism comprising the teeth 38 and 39 is released, the tension of the springs 48 will force the follower 45 down, producing a reverse rotative movement of the sleeve 40 until the follower assumes its normal position, as shown in Fig. 3. During this partial movement of the follower a partial vacuum is produced in the chamber 43 so that the rapid downward movement of the follower is partially resisted by the air pressure beneath the follower which exists until air has flowed into the chamber 43 through the groove 52 of the gravity valve 51.

I claim,

In a clutching mechanism, a driving member and a driven member, a screwthreaded member rotatively connected with said driven member and capable of a longitudinal movement, a second screwthreaded member engaging said first named screwthreaded member, means for rotatively connecting said second screwthreaded member with said driving member at will, and compressible resilient means for resisting the longitudinal movement of said first named screwthreaded member, whereby the amount of power imparted from said driving member to said driven member will be determined by the compressibility of said resilient means.

GEORGE SIEURIN.

Witnesses:
 PENELOPE COMBERBACH,
 NELLIE WHALEN.